United States Patent [19]

Cyvas

[11] Patent Number: 4,971,099
[45] Date of Patent: Nov. 20, 1990

[54] PRESSURE BALANCED CARTRIDGE CHOKE VALVE

[75] Inventor: Matthew K. Cyvas, Kingwood, Tex.

[73] Assignee: Cooper Industries, Inc., Houston, Tex.

[21] Appl. No.: 451,302

[22] Filed: Dec. 15, 1989

[51] Int. Cl.⁵ .......................................... F16K 11/07
[52] U.S. Cl. .............................. 137/270; 137/454.2; 137/625.3; 251/282
[58] Field of Search ............... 137/270, 269, 270.5, 137/454.2, 454.6, 625.3; 251/282

[56] References Cited

U.S. PATENT DOCUMENTS

| | | | |
|---|---|---|---|
| 2,918,087 | 12/1959 | Curran | 137/625.3 |
| 3,123,091 | 3/1964 | Elsey | 137/270 |
| 3,348,570 | 10/1967 | Nealy | 137/454.6 X |
| 3,730,479 | 5/1973 | Baumann | 137/625.3 X |
| 4,384,592 | 5/1983 | Ng | 137/625.3 X |
| 4,834,133 | 5/1989 | LaCoste | 137/625.3 X |

FOREIGN PATENT DOCUMENTS 624135 7/1961 Canada ........................ 137/625.3

Primary Examiner—Alan Cohan
Attorney, Agent, or Firm—Jackie Lee Duke

[57] ABSTRACT

An improved pressure balanced choke valve with a reversible cage style trim suitable for installation in production flowlines where it may be desired to later reverse the flow direction and use the well for water injection. The valve body has end connections machined thereon and a central bore for sealingly receiving a reversible cartridge assembly containing the cage style trim. The cartridge assembly is sealed against the valve body cavity by metal-to-metal seals and is easily removed for flow reversal by removal of a simple retainer cap. The cartridge assembly uses an inner sleeve movable within a cage type trim to control the flow. The cartridge is surmounted by a bonnet assembly utilizing a handwheel operated traveling nut assembly to control movement of the inner sleeve.

8 Claims, 5 Drawing Sheets

PRESSURE BALANCED CARTRIDGE CHOKE VALVE

BACKGROUND

As the production from oil and gas fields is depleted, it is desirable to use some of the wells and their associated valving and piping for water injection as part of a secondary recovery program. Typical installations have the gathering lines or piping and choke valves initially installed in a permanent manner with the choke valves oriented for production from the oil or gas well. If the decision is subsequently made to use a particular well for water injection, and flow in the reverse direction through a particular choke valve is required, previous designs have necessitated that the choke valve be unbolted or the pipe line be cut. This is due to previous choke valves having been designed for flow in one direction. Reinsatallation then entails rerouting of lines and welding to allow the new choke valve to be properly oriented for reverse flow. This removel, rerouting and reinstallation involves considerable time and expense for the field operator.

This invention is for an improved cartridge chocke valve which is pressure balanced to reduce the loads imposed on the actuation means. It uses a cage style trim to provide the superior flow control characteristics and wear resistance typical of the cage design. A removable cartridge assembly allows the body to remain in the flowline during reversal of the trim thereby permitting flow in either direction. Prior valves with reversible trim include the valve disclosed in the E. A. Corbin, Jr. U.S. Pat. No. 2,196,202. The Corbin valve allows reversal of its internal trim but requires an actuator which can work in either direciton.

The W.S.M.E. Crake U.S. Pat. No. 2,296,534 discloses a flow control valve with cage style trim in which a plurality of holes of varying diameter arranged in a helical manner are used to allow a more accurate cotnrol of the flow rate. A pressure balanced cage is disclosed with an outlet port disposed at a right angle thereto.

The G. A. Keith U.S. Pat. No. 3,606,911 discloses another valve with reversible trim to allow changing the flow characteristics of the valve. The Keith invention does not provide for pressure balancing of the cage.

The M. R. Jones U.S. Pat. No. 3,589,674 discloses a ball valve with internal trim that can be easily replaced as a complete unit. The Jones structure is not pressure balanced and does not permit throttling of the flow.

SUMMARY

This invention pertains to a cage style trim choke valve with a pressure balanced stem and a pressure balanced removable cartridge. The removable cartridge allows the trim of the valve to be removed as a unit without removing the valve body from the pipeline. This permits reinstallation of the trim in reverse orientation when it is desired to reverse the direction of flow through the choke valve in order to use the well for water injection.

The improved choke valve includes a main body with a cylindrical central chamber for receiving the pressure balanced removable cartridge, and a flow passage transversely intersecting the chamber. The reversible cartridge is a cylindrical member with a flange on one end and a conventional bonnet attached to the flange and having a handwheel operated actuation means. The cartridge is retained in the central chamber by a plate bolted to the opposite end of the cartridge body. A cage and internal sleeve within the cartridge which is axially movable by the handwheel operated actuation means controls the flow therethrough.

An object of the present invention is to provide an improved choke valve which retains its flow control features and characteristics irrespective of flow direction.

Another object of the present invention is to provide a choke valve which allows quick removal and reinstallation of the trim without requiring removal of the choke valve from the flowline.

A further object of the present invention is to provide a choke valve with pressure balanced trim to mimimize the loads imposed on the actuation means.

BRIEF DESCRIPTION OF THE DRAWINGS

These and other objects and advantages of the present invention are set forth below and further made clear by reference to the drawing wherein.

DESCRIPTION OF THE PREFERRED EMBODIMENT

Figure 1:
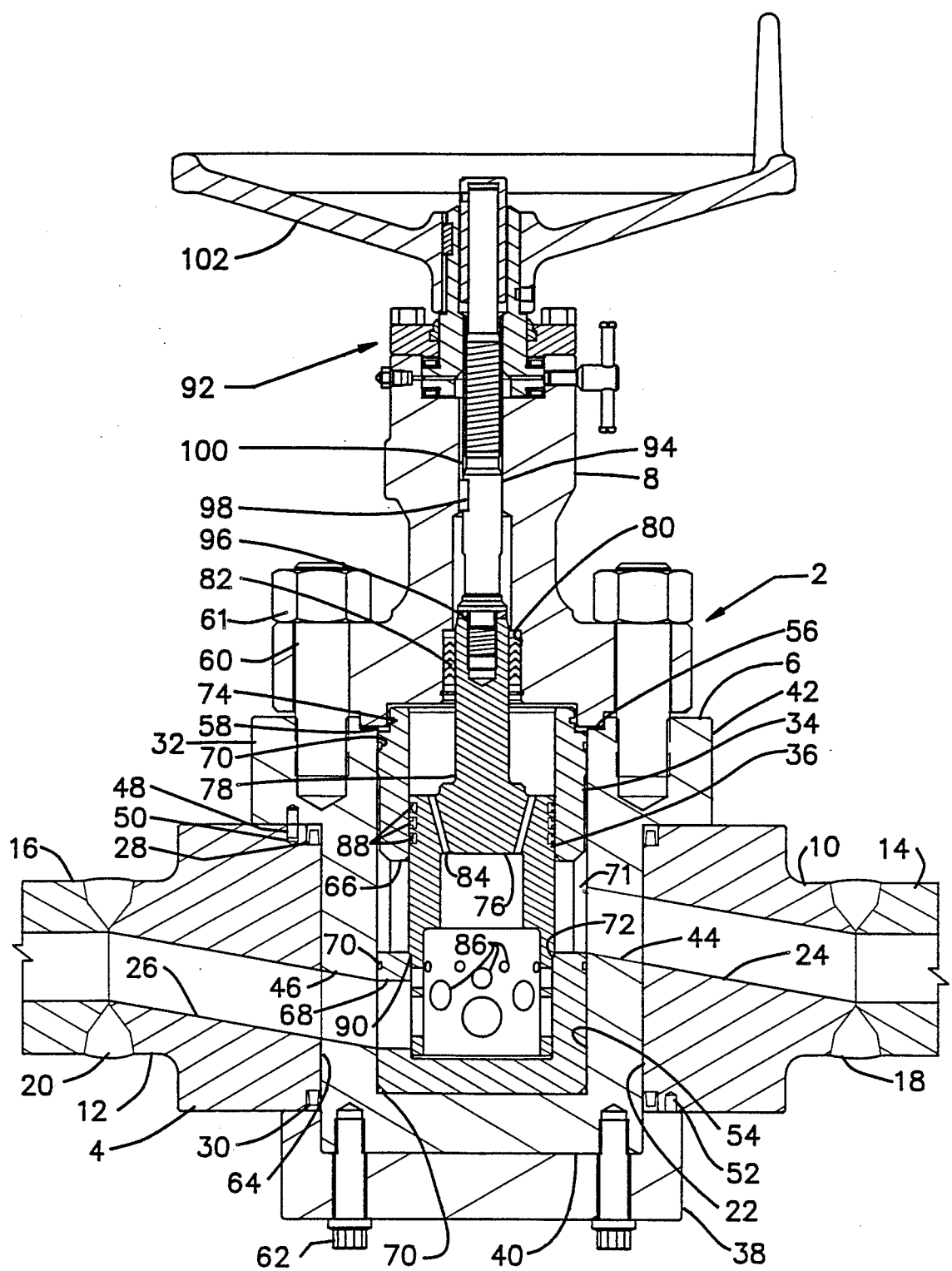
FIG. 1 is a sectional view of the improved choke valve having internal sleeve and cage style trim with the internal sleeve in the fully closed position.

With reference to FIG. 1, the improved choke valve of the present invention, denoted generally by numeral 2, is composed of body 4, cartridge assembly 6 and bonnet assembly 8. Body 4 is in the shape of a rectangular parallelepiped with reduced end portions 10 and 12 having the inlet port 24 and outlet port 26, respectively, extending therethrough. Piping portions 14 and 16 are attached to end portions 10 and 12, respectively, by suitable menas such as circumferential butt welds, 18 and 20. As shown in FIG. 1, flow is from piping portion 14 into choke valve 2 and out piping portion 16.

Choke body 4 has a central cylindrical bore 22 connecting its upper and lower faces which receives cartridge assembly 6. Central bore 22 is intersected by obliquely disposed flow passages 24 and 26, which communicate with passages in inlet piping 14 and outlet piping 16, respectively.

Central bore 22 has metal seal rings 28 and 30 disposed in grooves on the upper and lower faces of body 4 for sealingly engaging cartridge assembly 6. Cartridge assembly 6 is composed of body 32, cage 34, inner sleeve 36 and retainer cap 38. Cartridge body 32 is a generally cylindrical member with a closed lower end 40 and integral flange 42 on its upper end. The central portion of body 32 has obliquely disposed flow passages 44 and 46 extending through the wall on opposite sides.

Radially disposed and press fit into the lower face of integral flange 42 is orientation pin 48 coacting with hole 50 on the upper face of choke body 4 to maintain flow passage 24, 44 and 26, 46 in proper orientation. Pin 48 on the lower face of flange 42 and hole 52 on the lower face of body 4 function similarly in a manner to be explained hereinafter. Bore 54 of body 32 has counterbore 56 on its upper end, with sealing means 58 and the raised face of bonnet assembly 8 retained therein by suitable means, as studs 60 and nuts 61.

Retainer cap 38 is connected to lower end 40 by suitable retaining means such as cap screws 62 and cooperates with flange 42 to lock cartridge assembly 6 in place within bore 22. Seal rings 28 and 30 seal on the outside surface 64 of cartridge body 6 thereby balancing the pressure end loads caused by the pressure in flow passages 24 and 26 acting across the bore 22 of body 4. Consequently, the retaining means 62 carries no pressure end load.

Cage 34 is a generally cylindrical member with a closed lower end which is a slip fit in bore 54 of cartridge body 32. The central portion of cage 34 has a reduced diameter thereby providing annular chamber 71 for improved flow characteristics. A plurality of radially disposed apertures 66, are equally spaced circumferentially on cage 34. Cage 34 is installed into bore 54 and is oriented to place a pair of apertures 66 adjacent inlet flow passage 44 to enhance flow distribution. Axially displaced below apertures 66 is radially disposed outlet aperture 68, aligned with outlet flow passages 16 and 46. The top, middle and lower portions of the exterior of cage 34 are sealed against bore 64 by 0 rings 70. Seal shoulder 72 is disposed on the interior of cage 34 for engagement with inner sleeve 36 in a manner to be described hereinafter. Groove 74 is provided on the upper exterior of cage 34 to aid in removal of the cage when required for servicing.

Coacting with cage 34 to control fluid communication between inlet port 44 and outlet port 46 is internal sleeve 36. Sleeve 36 is a generally cylindrical member with a closed upper end 19 and a cylindrical neck portion 78 extending therefrom. Neck 78 is sealingly received within counterbore 80 of bonnet assembly 8. Suitable sealing means as chevron type packing assembly 82, seals the annulus between neck portion 78 and counterbore 80. Pressure balancing ports 814 in upper end 76 of sleeve 36 provide fluid communciation between the interior of internal sleeve 31 and the interior of bonnet assembly 8 to minimize the load imposed on the actuation means 92, described hereinafter.

The interior portion of internal sleeve 31 is stepped and includes a plurality of radially disposed flow passages 86 of varying diameters, passing through the wall of the lower portion. Passages 86 are arranged in pairs of the same diameter on opposite sides of internal sleeve 36 in facing relationship. This arrangement of flow passages 86 serves to direct incoming flow streams against one another thereby dissipating their energy and reducing their erosive effects.

The exterior of internal sleeve 31 adjacent closed upper end 76 has suitable sealing means such as a plurality of seal ring 88 disposed thereon which also function as wiper rings. Shoulder 90 is disposed on the central exterior portion of internal sleeve 36, above flow passages 86. It is shaped to conform to seal shoulder 72 such that when internal sleeve 36 is in the closed position as shown in FIG. 1, apertures 66 and inlet passage 44 are blocked.

Figure 2:
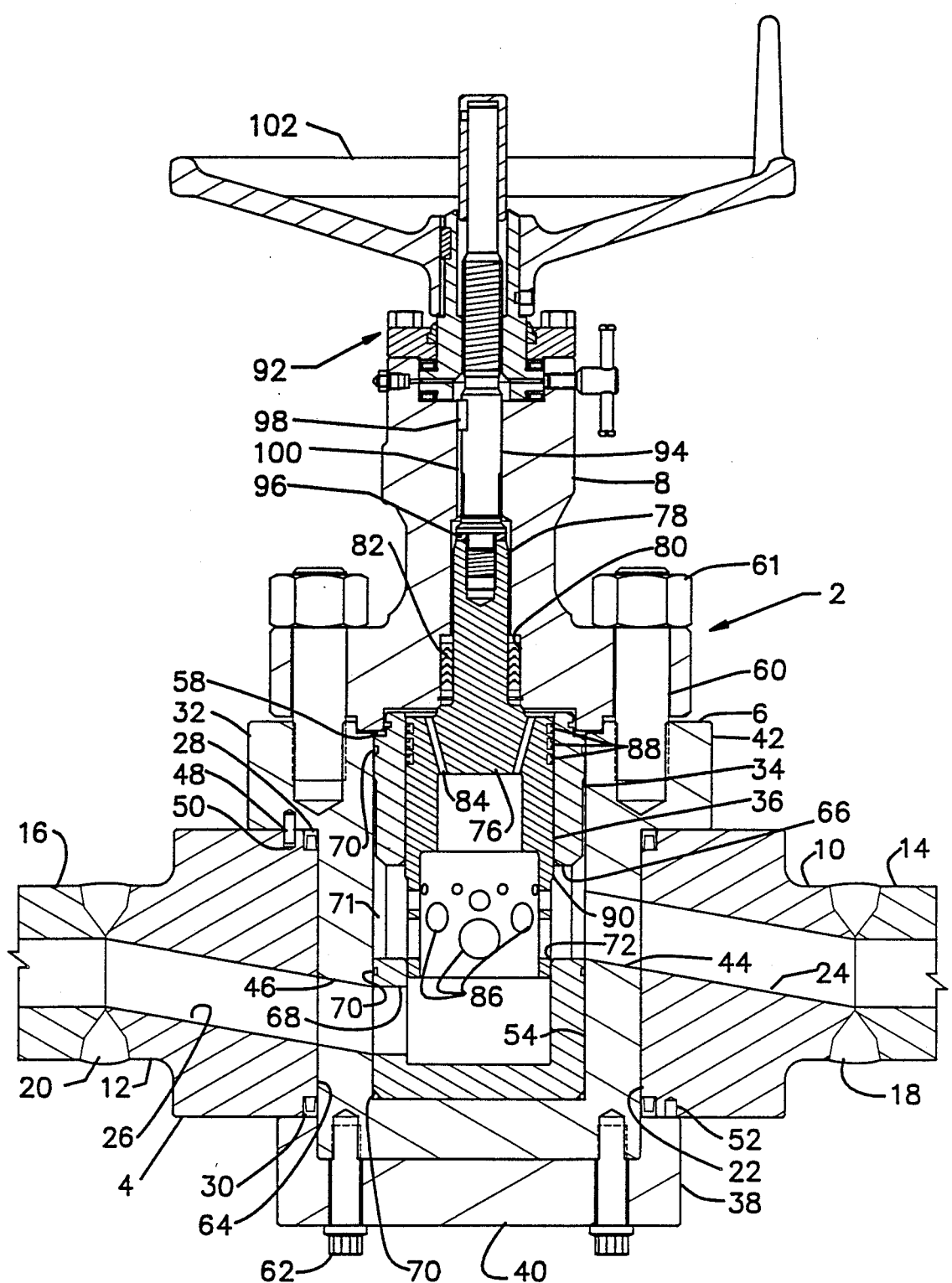
FIG. 2 is a sectional view of the improved choke valve having internal sleeve and cage style trim with the internal sleeve in the fully open position.

Similarly when internal sleeve 36 is in the fully open positon as shown in FIG. 2, the flow path is into inlet passage 24 and 44, through flow apertures 66, across flow passages 86 and through outlet aperture 68 to outlet passage 26 and 46. Internal sleeve 36 can be set an any position between fully open or fully closed to obtain the desired flow rate. The actuation means of internal sleeve 326 is denoted generally by numeral 92. Actuation means 92 is a travelling nut assembly of conventional design well known by those by those skilled in the art. Stem 94 of actuation means 92 threadedly engages neck 78 with lockwasher 96 interposed therebetween to prevent disengagement. Antirotation key 98 mounted on stem 94 coacts with groove 100 of bonnet assembly 8 to provide axial movement of inner sleeve 36 when handwheel 102 is rotated.

Figure 3:
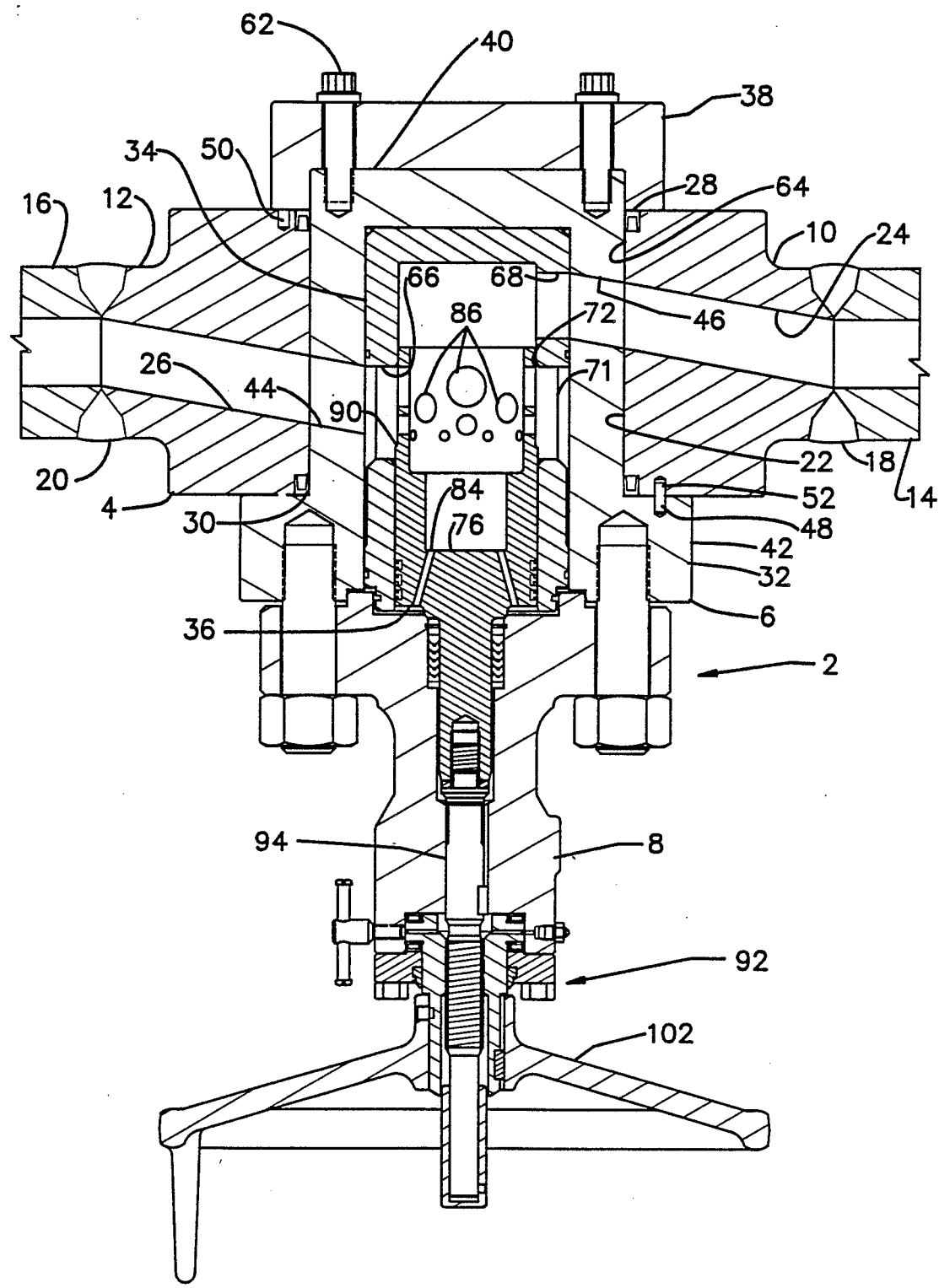
FIG. 3 is a sectional view of the improved choke vale with the position of the removable trim cartridge and bonnet reversed from the of FIG. 2.

With reference to FIG. 3, the cartridge assembly 6 and bonnet assembly 8 have been reversed with respect to FIGS. 1 and 2 without removing the body 4 from the flowline. This is accomplished by first removing cap screws 52 and retainer cap 38. Cartridge assembly 6 with bonnet assembly 8 connected thereto is removed from body 4 and then rotated about the horizontal and vertical axes to align pin 48 with hole 52. Pin 48 enters hole 52 as cartridge assembly 6 is reinserted in body 4 thereby maintaining proper orientation. Retainer cap 29 and cap screws 52 are replaced and flow can now be directed from piping portion 16 through choke valve 2 and into piping portion 14. It will be observed that in this reversed position, inlet flow passage 44 is now aligned with passage 26 and outlet flow passage 46 is aligned with passage 24. Thus, the direction of flow is reversed while maintaining the original flow control features and ease of operation without requiring any cutting, welding or disassembly of flowlines.

Figure 4:
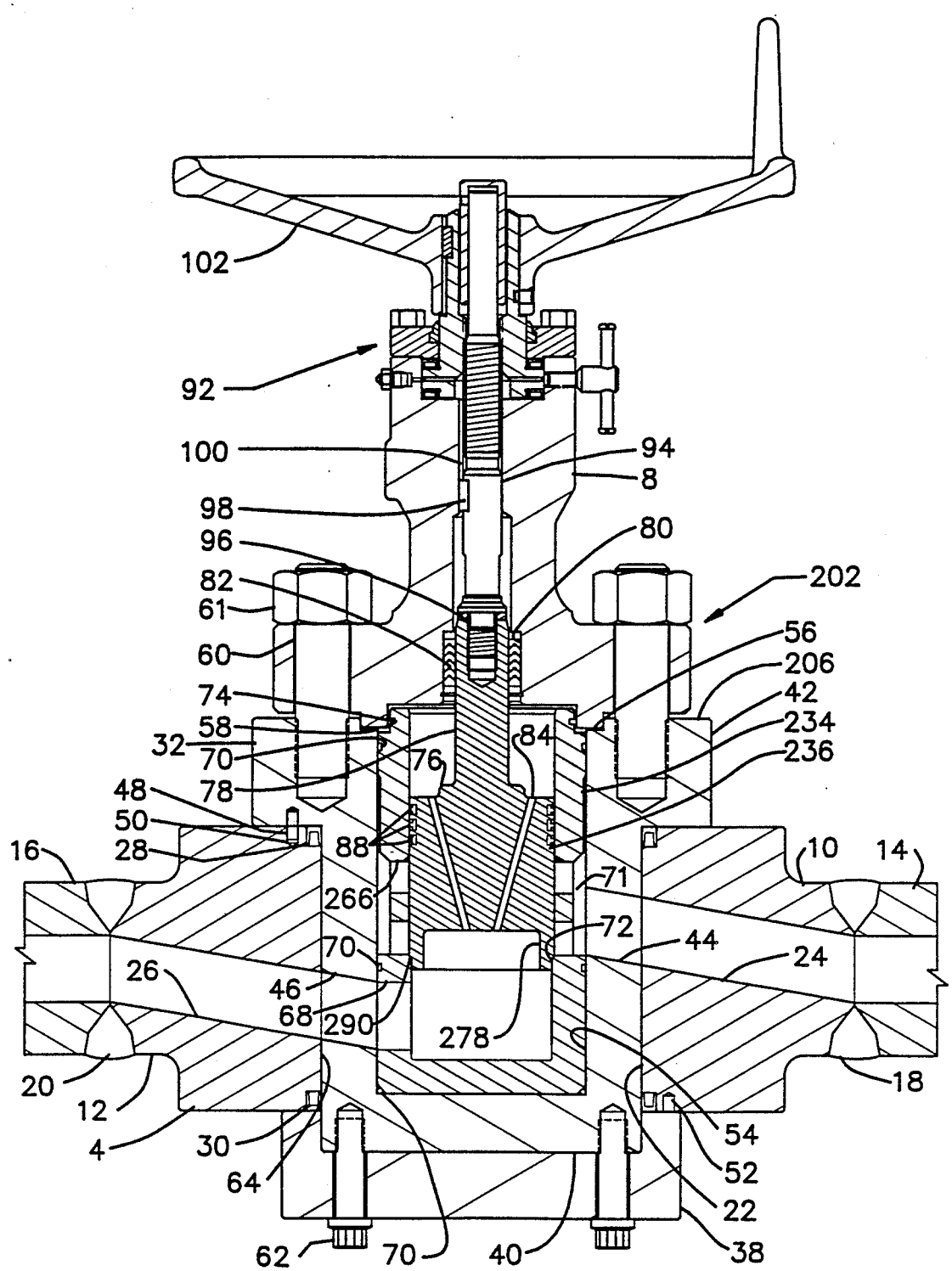
FIG. 4 is a sectional view of an alternate embodiment of the improved choke valve having plug and cage style trim with the plug in the fully closed position.

An alternate embodiment of the improved cartridge choke valve is shown in FIG. 4. This alternate embodiment differs from the preferred embodiment of FIGS. 1-3 only in the change of trim style from internal sleeve and cage to plug and cage. Those components in FIG. 4 which are identical to those in the preferred embodiment carry the same numeral designation.

The alternate embodment, denoted generally by numeral 202 is composed of body 4, cartridge assembly 206 and bonnet assembly 8. Cartridge assembly 206 is composed of body 32, cage 234, plug 236 and retainer cap 38. Cage 234 is a generally cylindrical member differing from cage 34 only in the quantity and placement of flow apertures 266. The middle portion of cage 234, adjacent annular chamber 71, has a plurality of radially disposed flow apertures 266 therethrough. Flow apertures 266 are arranged in axially aligned pairs of different diameters with a matching pair of flow apertures on the opposite side of cage 234 in facing relationship. As in the preferred embodiment, this arrangement of flow apertures allows incoming flow streams to be directed against one another, thereby dissipating their energy and reducing their erosive effects.

Cage 234 is installed into bore 54 and oriented to place a pair of apertures 261 adjacent inlet flow passage 44 to enhance flow distribution. The top, middle and lower portions of the exterior of cage 234 are sealed against bore 64 by 0 rings 70. Seal shoulder 72 is disposed on the interior of cage 234 for engagement with plug 236 in a manner to be described hereinafter.

Coacting with cage 234 to control fluid communication between inlet port 44 and outlet port 46 is plug 236.

Plug 236 is a generally cylindrical member with a closed upper end 76 and a cylindrical neck portion 78 extending therefrom. Neck 78 is received and sealed within bonnet assembly 8 in the same manner as the preferred embodiment of FIGS. 1-3. Pressure balancing ports 84 in upper end 76 provide fluid communication between the recess 278 and bonnet assembly 8 to minimize the load imposed on the actuator means 92.

The exterior of plug 236 adjacent closed upper end 76 has suitable sealing means such as a plurality of seal rings 88 disposed thereon which also function as wiper rings. Shoulder 290 is disposed on the lower exterior portion of plug 236 and shaped to seal shoulder 72. When shoulders 290 and 72 are in contact as shown in FIG. 4, aperture 266 and inlet passage 44 are blocked. Plug 236 can be set at any position between fully open and fully closed to obtain the desired flow rate. In all other respects choke valve assembly 202 functions the same as choke valve assembly 2, providing the pressure balanced cartridge assembly 206 with its reversibility feature.

Figure 5:
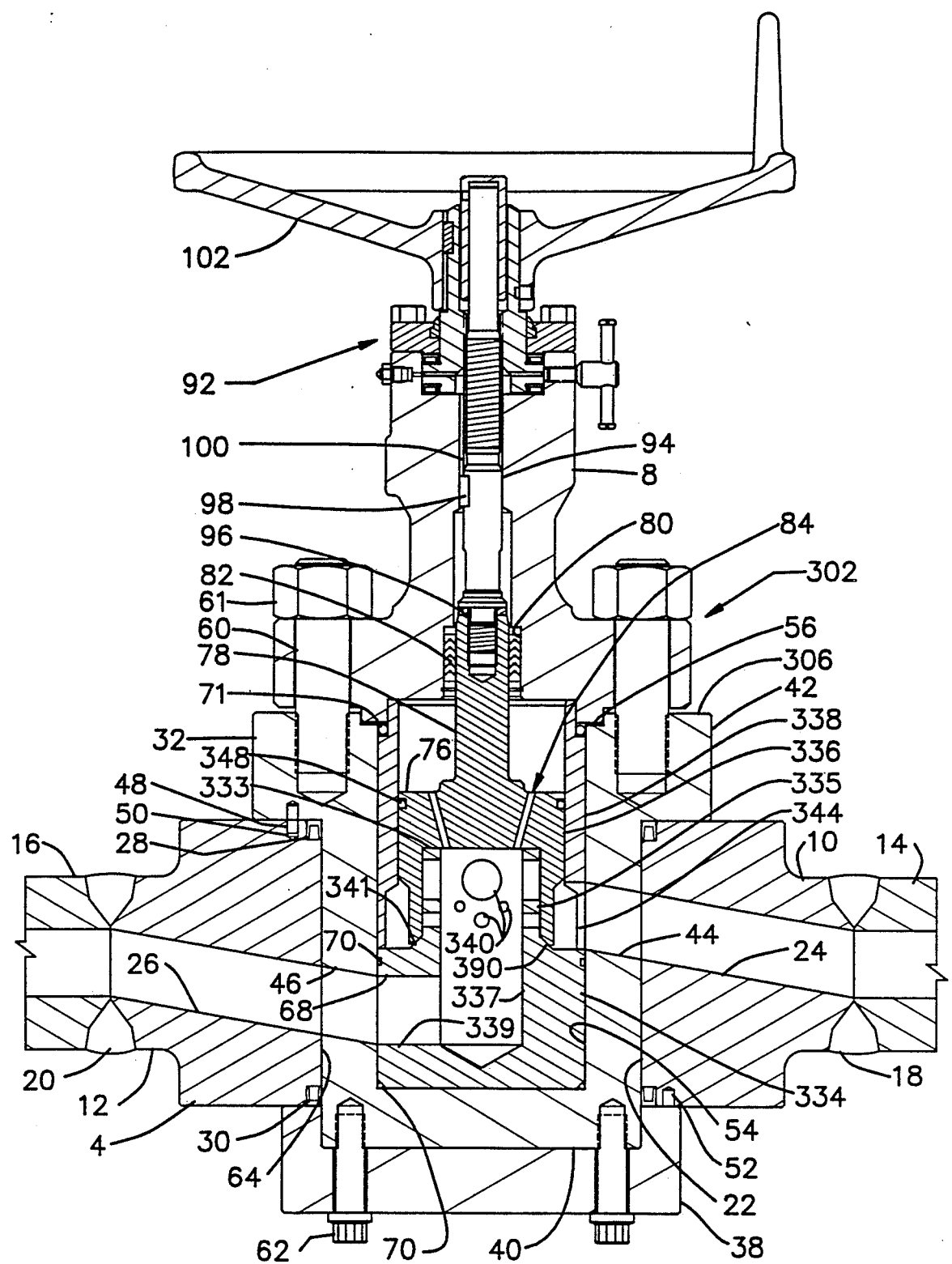
FIG. 5 is a sectional view of a second alternate embodiment of the improved choke valve having external sleeve and cage style trim with the external sleeve in the fully closed position.

A second alternate embodiment of the improvde cartridge choke valve is shown in FIG. 5. This second alternate embodiment differs from the preferred embodment of FIGS. 1-3 only in the change of trim style from internal sleeve and cage to external sleeve and cage. Those components in FIG. 5 which are identical to those in the preferred embodiment of FIGS.1-3 carry the same numeral designation.

The alternate embodiment, denoted generally by numeral 302, is composed of body 4, cartridge assembly 306 and bonnet assembly 8. Cartridge assembly 306 is composed of body 32, cage 334, external sleeve 336, cage retainer 338 and retainer cap 38. Cage 334 is a generally cylindrical member with a reduced upper portion 335. Vertical bore 337 extends from the upper face 333 of reduced upper portion 335 inwardly to its intersection with radially disposed outlet passage 339. The enlarged lower portion of cage 334 is a slip fit in bore 54 with 0 rings 70 disposed on the exterior thereof. Reduced upper portion 335 has a plurality of radially disposed flow apertures 340 of varying diameter extending through the wall. Seal shoulder 341 is disposed on the exterior of reduced upper portion 335. Apertures 340 are arranged in axially aligned pairs of different diameters witha matching pair of flow apertures on the opposite side of upper portion 335 in facing relationship.

Cage 334 is installed in bore 54 with outlet passage 339 aligned with passages 26 and 46. Cage 334 is retained in position by cage retainer 338. Retainer 338 is a tubular member, slidingly received within bore 54 and sitting on the enlarged lower portions of cage 334. The upper end of retainer 338 has a shoulder thereon for retaining 0 ring 71. The lower end of retainer 338 has a radially disposed flow port 344 therethrough which is aligned with inlet passges 24 and 44. Cage retainer 338 abuts the lower face of bonnet assembly 8 and retains cage 334 in position when bonnet assembly 8 is secured to body 32.

External sleeve 336 is a generally hollow cylindrical member with a closed upper end 76 and a cylindrical neck portion 78 which is received and sealed within bonnet assembly 8 as in the previously described embodiments. Pressure balancing ports 84 in upper end 76 function as previously noted. The exterior of external sleeve 336 adjacent closed upper end 76 has suitable sealing means such as 0 ring 348 disposed thereon which seals in the bore of cage retainer 338. The lower end of external sleeve 336 is counterbored to closely fit about reduced upper portion 335. Shoulder 390 is disposed on the lower interior edge of external sleeve 336 and shaped to conform to mating seal shoulder 341. When shoulders 390 and 341 are in contact as shown in FIG. 5, aperture 340 and inlet passage 44 are blocked. External sleeve 336 can be set at any position between fully opne and fully closed to obtain the desired flow. In all other respects choke valve assembly 302 functions the same as choke valve assembly 2, providing the pressure balanced cartridge assembly 306 with its reversibility feature.

It should be noted that while the preferred embodiment is shown with a handwheel operated actuation means the invention is readily usuable with a pneumatic or hydraulic actuator. The pressure balancing ports 84 serve to balance the forces acting on internal sleeve 36 and thereby minimize the size of actuator required to open to close the choke valve.

What is claimed is:

1. A pressure balanced cartridge choke valve comprising:
   a valve body with a central bore laterally intersected by an inlet and an outlet flow passage,
   a reversible and pressure balanced cartridge assembly sealingly retained within said valve body with flow controlling means positioned therein,
   said cartridge assembly including:
      a cartridge body with a central cavity laterally intersected by an inlet and an outlet flow passage,
      a means for retaining said cartridge assembly within said valve body, and
      a means for maintaining the inlet and outlet flow passages of said cartridge body in registry with the inlet and outlet flow passages of said valve body;
   an actuation means for positioning said flow controlling means, and
   said flow controlling means including a cage sealingly positioned within said central cavity of said cartridge body and a flow closure member sealingly engaging said cage.

2. A pressure balanced cartridge choke valve according to claim 1 wherein said registry maintaining means includes a first orientation hole adjacent the central bore of said valve body, a second orientation hole disposed on said cartridge body for alignment with said first orientation hole and an alignment pin interposed therebetween.

3. A pressure balanced cartridge choke valve according to claim 1 wherein said retaining means includes a retainer cap and bolting means attaching said retainer cap to said cartridge body.

4. A pressure balanced cartridge choke valve according to claim 1 wherein said flow closure member is an internal sleeve member with pressure balancing ports therethrough.

5. A pressure balanced cartridge choke valve according to claim 1 wherein said flow closure member is an external sleeve member with pressure balancing ports therethrough.

6. A pressure balancing cartridge choke valve according to claim 1 wherein said flow closure member is a plug member with pressure balancing ports therethrough.

7. A pressure balanced cartridge choke valve according to claim 1 wherein said actuation means includes a bonnet assembly with a stem sealingly received therein and connected to said flow closure member with a travelling nut assembly connected to said stem for positioning said flow closure member.

8. A pressure balanced cartridge choke valve for use in oil or gas production, comprising:
 a valve body with a central bore having an inlet flow passage and an outlet flow passage extending through the wall thereof,
 a reversible and pressure balanced cartridge assembly sealingly retained within said valve body with flow controlling means positioned therein,
 said flow controlling means including a cage sealingly positioned within said central cavity of said cartridge body and a flow closure member with pressure balancing ports and diametrically opposed flow passages,
 a cartridge retainer cap and bolting means attaching said retainer cap to said cartridge assembly maintaining said cartridge assembly within said central
 an orientation means including a first and a second orientation hole disposed in facing relationship on said valve body and said cartridge assembly, respectively, and an orientation pin interposed in said orientation holes to maintain said inlet and outlet passages of said valve body and cartridge in fluid communication, and
 a bonnet assembly sealingly secured to said cartridge assembly and including a travelling nut assembly operatively connected to said flow closure member by a stem for positioning said flow closure member.

* * * * *